US006985586B2

(12) United States Patent
Hill

(10) Patent No.: US 6,985,586 B2
(45) Date of Patent: Jan. 10, 2006

(54) DISTRIBUTED INFORMATION AND STORAGE SYSTEM

(75) Inventor: Michael John Hill, Coppet (CH)

(73) Assignee: Nagracard S.A., Cheseaux-sur-Lausanne (CH)

( * ) Notice: Subject to any disclaimer, the term of this patent is extended or adjusted under 35 U.S.C. 154(b) by 956 days.

(21) Appl. No.: 09/796,261

(22) Filed: Feb. 28, 2001

(65) Prior Publication Data

US 2002/0080962 A1 Jun. 27, 2002

(30) Foreign Application Priority Data

Dec. 22, 2000  (CH) .............................. 2518/00

(51) Int. Cl.
*G06F 17/00* (2006.01)

(52) U.S. Cl. ........................... 380/231; 380/200; 725/2; 725/4

(58) Field of Classification Search ................. 380/200, 380/231–234, 210–212, 255–264; 725/1–5, 725/105–134; 370/200–205; 213/150–154
See application file for complete search history.

(56) References Cited

U.S. PATENT DOCUMENTS 5,341,425 A   8/1994   Wasilewski
5,898,456 A   4/1999   Wahl

FOREIGN PATENT DOCUMENTS

EP   0672991 A2   9/1995
EP   0843449 A2   5/1998
EP   0884669 A2   12/1998

WO   WO 00/11871   3/2000

OTHER PUBLICATIONS

A stream tapping protocol with partial preloading Paris, J.–F.; Modeling, Analysis and Simulation of Computer and Telecommunication Systems, 2001. Proceedings. Ninth International.*
Improving video–on–demand server efficiency through stream tapping Carter, S.W.; Long, D.D.E.; Computer Communications and Networks, 1997. Proceedings., Sixth International Conference on , Sep. 22–25, 1997.*
Implementation of a terrestrial return channel for digital interactive video broadcast Allan, R.; Taylor, C.; Broadcasting Convention, 1997. International , Sep. 12–16, 1997.*
Chang, Y –H., et al.: An Open–Systems Approach to Video on Demand, IEEE Communications Magazine, vol. 32, No. 5, 68–80, May 1, 1994.

* cited by examiner

Primary Examiner—David Jung
(74) Attorney, Agent, or Firm—Clifford W. Browning; Woodard, Emhardt, Moriarty, McNett & Henry LLP

(57) ABSTRACT

The aim of the present invention is to propose a method that allows the reduction of the bandwidth needs in a structure that implements an operating center and a plurality of user units, ensuring the availability for the final user, of a product amongst a vast choice and being able to be downloaded by said user in a short period of time.

This aim is achieved by a system that implements at least one operating center that has a great number of products, a plurality of user units comprising security and storage means, characterized in that the link between at least one group of user units is of the bidirectional type and that the operating center comprises means for the transfer of a product that is stored in the storage means of a user unit to another user unit.

14 Claims, 3 Drawing Sheets

DISTRIBUTED INFORMATION AND STORAGE SYSTEM

This invention concerns a system and a method of management of distributed data, particularly in a system that involves an operating center and a plurality of user units.

BACKGROUND OF THE INVENTION

In a data distribution system from a central site to a great number of users, the organisers of such a resource are regularly occupied with two matters. The first concerns the security of the data, that is, to ensure that the targeted user is the only one to receive the requested data, and for his/her use only.

The second matter is the capacity of the distribution means, that is, the galvanic or optic lines, cable, or the radio-relay network.

The operating center has an important data base that contains the products offered to the users either subject to payment or free of charge. According to the recent structures of this type of center only one part of these products are stored locally, the other products being stored by the producer of these data and linked to the operating center by high speed communication means.

The user sends a request to the operating center comprising his/her identity, address, and the desired product.

The operating center determines the acceptability of this request, particularly according to the payment methods of this user. These methods can be by subscription, with unlimited access to the products, upon presentation of bills, payment by credit card, or pre-payment.

The product is sent in encrypted form with a user's key, that is, according to a key that is contained in a security module at the user's location.

This type of service is used for hiring video films through pay television. In this use the subscriber has a security module connected to his/her decoder that processes the encrypted data and sends the decryption keys to the decoder. This security module also administers credit information.

This system works today with the so called form NVOD (Near Video On Demand) and VOD. In the first case (NVOD) the proposed product for buying is sent loopback to all the users, sometimes through several channels simultaneously with a time delay. The buyer then can only buy this specific product and will wait for the next emission to start the visual display. An embodiment of this mode consists in sending several products during the time of inactivity of the system (generally in the morning), said products being stored in the mass memory of the decoder. The products thus memorised are then proposed to the user for buying and can be visualised at any given moment.

In either of these embodiments the number of proposed products is lower than ten, taking into account the transmission and storage possibilities of a product.

The second case, which is particularly interesting, proposes supplying the product of your choice amongst a very important catalogue of products. Each user can then choose from this catalogue and the operating center sends him/her the desired product. This is only possible in a restricted environment with very important transmission capacities.

The implementation on a large scale of such a system has very quickly collided with the bandwidth limits of the transmission means. Just to remember, it is reminded here that the transmission of a 2 hour film represents 1 gigabyte of high compressed data.

SUMMARY OF THE INVENTION

The aim of this invention is to propose a system and a method that allows the reduction of the bandwidth needs ensuring a better availability for the final user of a product amongst a vast choice, and being said user able to receive this product in a short period of time without compromising the quality or the time to obtain this product.

This aim is achieved by a system that implements at least one operating center that has a great number of products, of a plurality of user units comprising security and storage means, characterised in that the link between at least one group of user units is of the bidirectional type and that the operating center comprises means for transferring a product that is stored in the storage means of one user unit to another user unit.

In this way, thanks to this system, the operating center uses the storage means of the user units as intermediate storage means. It is enough to send the product only once to a user amongst a group of users so that each request of the same product coming from this group of users does not cause the transmission from the operating center, but the unit containing the desired product will take the relays locally to transmit it to the final user.

This invention includes also a method for the optimisation of the transmission on demand towards a final user, method consisting in:

receiving by the operating center of a transmission request of a product from a first user unit connected to a local bi-directional network, determining if the requested product is already in a second user unit connected to the same local network, if the negative event, transmitting from the operating center to the first user unit and storing the product in said first user unit, if the positive event, ordering the transfer of the product from the second unit to the first user unit, transmitting by the operating center the necessary data for the decryption of the product.

This method also comprises a detection phase, that is, a test phase in order to know which user units have such a product. This can be achieved in a centralised way as it is directed by the operating center, but it can equally be established by means of a request to the user units.

In fact, a unit may be disconnected or may not be capable anymore of carrying out this transfer. In this case, the method according to the invention consists in determining which are the units that have the desired product and ordering the transfer from one unit to another.

An important aspect of the invention is that it takes security into account during these operations.

Each product is sent in encrypted form. The encryption operation is ensured by a transport key CA normally generated in a random way. According to an embodiment of the invention, it is under this form that the operating center stores the products.

When the user A requests a product X, the key CA, having been used to encrypt the product X, is encrypted by a key Ka of the user A and is enclosed with the encrypted data of the product X.

When the user unit A is asked to transmit the product X to the unit B, only the encrypted product X is transmitted onto the bidirectional network. The operating center, knowing the key CA, will encrypt it according to a key Kb of the user B and transmits it to him/her. Once the X product coming from the A unit and the Kb key arrive at unit B it is then possible for the B unit to dispose of product X.

The amount of information transmitted from the operating center is negligible compared to the transmitted data between unit A and unit B.

It is necessary that the link between a group of users is of the high speed bidirectional type. On the contrary, it is not necessary that the link with the center is of the same type. It is also possible that only the link to the users is of the high speed type (for example by satellite link), the return path being carried out by a classical modem.

According to an embodiment of implementation of the invention, the user units are linked to several networks. These networks are administered by different operators and the method according to the invention allows the use of the connection capacities by another operator to carry out the transfer.

An example of such a configuration implements a unit that comprises a Hertzian receiver (or satellite) and an interface with a cable network. According to this example the operating center has a one way route to its subscriber with the Hertzian route. Nevertheless, the operating center has the necessary information for finding the subscriber on the cable network of another operator.

It will then be possible to transfer the requests for products to the operating center and inversely, the center will be able to request the transfer of a product from a subscriber of the cable network to another subscriber.

BRIEF DESCRIPTION OF THE DRAWING FIGURES

The invention will be better understood with the following detailed description that makes reference to the annexed figures in which.

DETAILED DESCRIPTION OF THE PREFERRED EMBODIMENTS

Figure 1:
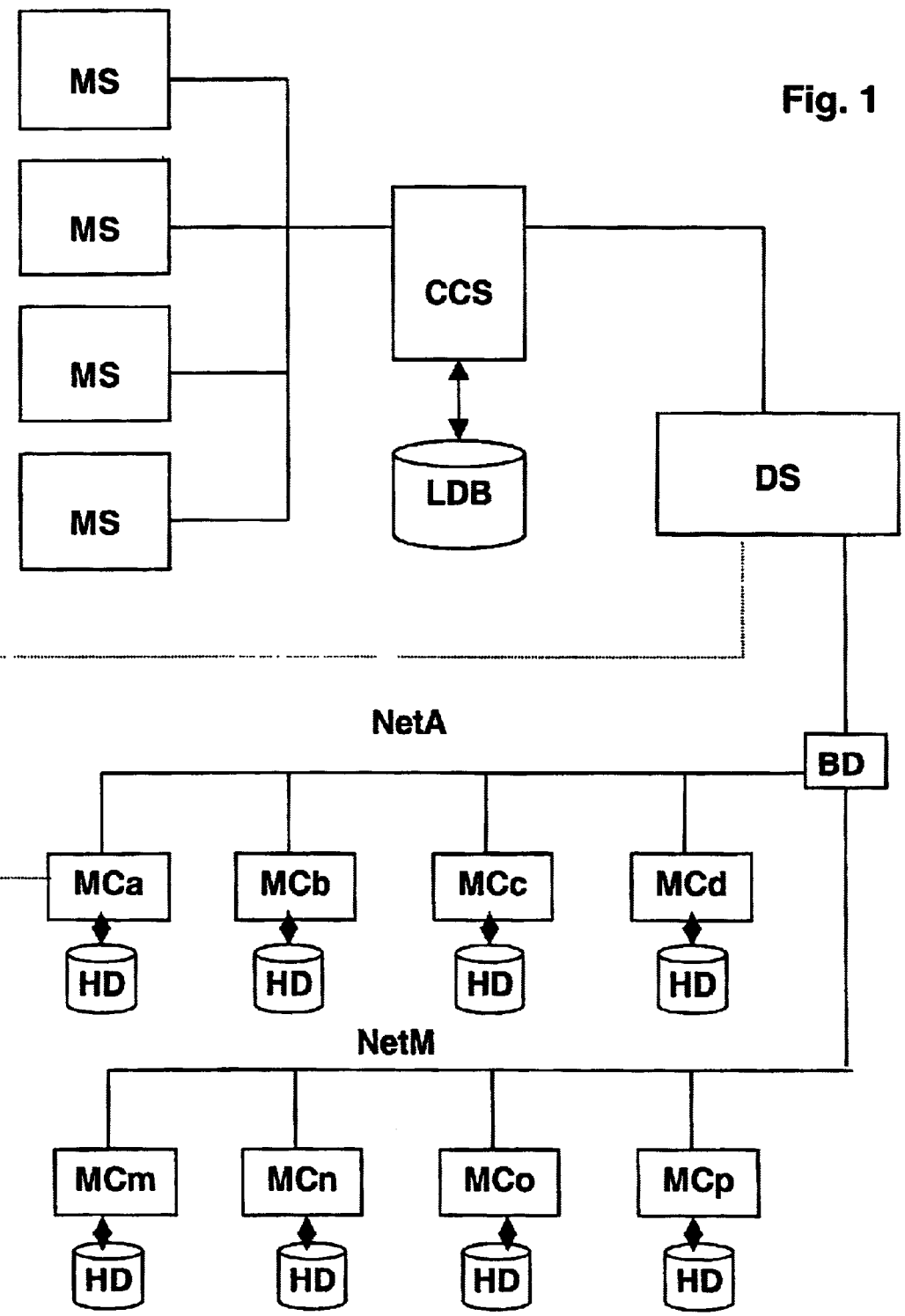
FIG. 1 represents the configuration of the system of the invention.

In FIG. 1 the operating center DS is linked upstream to the processing center CCS in charge of administering the requests of products to be sent coming from the users. For this purpose it has a local storage memory LBD that contains the most often requested products. This processing center CCS is equally linked to the on-line data base services MS which it can solicit at any time. These servers MS are linked to the processing center CCS by means of a high speed link.

The operating center DS is linked by known means to the user units MC (cable, fibre optics, Hertzian, ADSL, T1 . . . ). These units have storage means HD of enough capacity for storing at least one product, for example several gigabytes.

The link between each unit MC and the center can be either through the same channel in which the data are sent to the units or through an alternative channel such as by modem, by ADSL connection, or GSM represented by the dotted line.

A request is sent by the unit MCa to the operating center DS for a product X. The center examines if this product is already present in one of the units connected to the same fast network NetA, in any of the units MCb, MCc and MCd in our example.

The concentrator BD in our example does not allow the link between the network NetA and NetM. In the inverse hypothesis, units MCm to MCp would equally be taken into account for determining the presence of the product X.

If the product X is not found in any unit it is sent to the unit MCa, encrypted by a transport key CA, this key being itself encrypted by a key specific to the unit MCa.

When the unit MCd requests the same product X to the operating center, the center transmits to the unit MCa the instruction to transfer the product X encrypted with the key CA. In parallel, the operating center sends to the unit MCd the transport key CA encrypted by a key specific to the unit MCd. The latter is from then on capable of disposing of product X.

Figure 2:
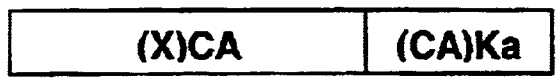
FIGS. 2 to 4 represent the packages of exchanged data between the operating center and the user units.

FIG. 2 represents a package sent by the operating center to a user unit MCa. The product X is encrypted by the key CA, itself being encrypted by the key specific to the unit MCa, the key Ka.

Figure 3:
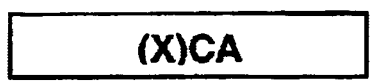
Figure 4:
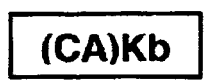

The center asks the unit MCa to transfer the product X to the unit MCb and it is the package represented in FIG. 3 that is sent on the local network.

The operating center sends the key CA, encrypted by the key specific to the unit MCb to the latter.

It is then possible that one user unit contains several products in its storage unit. To administer this memory it is provided, according to the invention, to enclose to each product a persistence indicator. In fact, if this product is highly specialised, there will be few probabilities that it will be requested by another user. In this case, the product will be erased from the storage unit after a short period of time.

Inversely, if this product is a well known novelty, the duration of storage will be long in order to satisfy a maximum of users.

This persistence indicator can be turned to zero on every transfer request or by a command from the operating center.

This structure allows to administer in an optimal way the storage capacities of the user units. In fact, when the product X is sent to the unit MCa, it is instantly available on the net. In order to anticipate another request from another group the MCm unit is requested to store the product X as well. The packet of the unit MCa containing the key CA encrypted with the key Ka is not stored in the unit MCm.

The operating center is then ready to face a request from a member of the group A (NetA) and of the group M (NetM). This practice can be generalised for storing each product sent by at least one unit of each group.

To determine which unit will be chosen, reference can be made to the available space in said unit, the preferences of the user or of a user group.

When knowing the profile of the user, it is possible to anticipate his/her demand, if the product corresponds to a category that is regularly bought by said user. It is equally possible to use a unit having a very small use by its user.

For the administration of a group of users' profile, it is possible to establish the preferences of this group and to anticipate their eventual needs. According to the location of the considered local network, a group will be more interested in sports, and it will be this category of products that will have priority of storage in the units of this group.

One of the problems that the operating center may encounter in its attempt to transfer from one unit to another, is related to the activity of the unit containing the product.

According to the executions, a unit may not be able to send a product on the network and at the same time display another product (or the same) for its owner.

The center can know to a certain extent the supposed activity of each unit but the impulsive buying procedures may function without synchronised connection to the operating center. The authorisation and the credit is administered in the user's security module.

This aspect is particularly important when the units have no high speed return route to the operating center. In this case, it is not desirable to ask each unit its status to know the activity on the unit that has the product in its storage means.

This is why when a unit A requests a given product, said unit previously collects the list of products that are stored in the units belonging to the same network. This operation is very fast and does not penalise the performance of the network as the quantity of exchanged data is very small.

In the data that is sent by the other units to unit A the state of each unit is equally included. A unit can then signal that it is not available for a download operation.

Once these data have been collected, unit A sends them to the operating center with the request for the desired product. The center can verify the state of each unit depending on the picture it has in its data base and transmit the transfer instruction to the unit that is most capable of carrying out the transfer without disturbance to its user.

This manner of proceeding allows the operating center to regularly dispose of reliable information on the totality of user units. It would also be possible to eliminate the picture for each unit of the sent products in order to use only the list that is received with each request.

In an embodiment of the invention, unit A sends a request specifying the desired product to the local network. The other units that have this product make themselves known and also signal their availability. According to the chosen protocol, unit A immediately requests the transfer of product X from the unit that is capable of supplying it. Unit A contacts the operating center to inform it of its wish to use product X and informs it that this product is already in its storage unit. The center has only to transmit the key specific to unit A. This can be done through the same channel that is used by unit A (for example, by modem) or by the standard transmission route (cable, satellite, fibre optics . . . ).

For operational reasons, once the list of stored products in their storage unit is transmitted, the user units block the persistence indicator during the pre-selected time in order to avoid that a product is erased during the interval separating this inquiry and a possible transfer order.

When the transfer is carried out, unit A confirms that this transfer is successfully finished together with its signature. The latter will allow to retrace the use of all the sent products, for example, in order to assess a report to the on-line data base service.

When a new film is issued, a previous transmission is carried out in order to store this film at least in one unit per group. When it is promotionally launched, the demand of the users can immediately be satisfied according to the embodiment.

This method can be generalised in order to use the storage capacities of the user units. It is common to connect a great number of units to a local network. The use of only a part of the storage capacities (for example 50%) of each unit represents the possibility of storing a great number of products amongst all these units. For a hundred units connected to a network this means about 500 products immediately available.

The preferences of units that have very little activity will be selected in order to not penalise the normal use of the unit. It is also possible to store this film in several units per group in order to ensure that a distribution can be made at all times.

According to an embodiment, different copies of the same product are encrypted by a different key CA. When the product X is sent to a member of the group NetA, the key CA1 is used. It is with a key CA2 that the same product X is encrypted and sent to a member of the group NetM. This allows to minimise the consequences of a malicious decryption of product X. In this case only the members of a same group could obtain the key CA1 and dispose of product X without compensation.

Figure 5:
FIG. 5 represents a package of exchanged data between the operating center and the user units accompanied by a header and a transaction registration section.

The encrypted product is accompanied by a header HD as illustrated in FIG. 5. This header is not encrypted so that the type of product that is stored in the unit can be recognised. It contains the title, the source of the product, the date of creation, the duration of validity (or persistence index), a signature of the operating center and of the on-line data base service with their certifications, and the number of possible transfers. This list is not comprehensive and can comprise other information.

This block of data is accompanied by a signature in order to guarantee that these data are not modified.

To follow and retrace the different transfers of a product from one unit to the other a transaction registration section TR is added to said product. This section is divided in to modules, each module allowing to retrace one transfer.

Unit A contains the product X in its storage unit. When a transfer to unit B takes place, unit A inscribes its signature in the available module with the status "transmitted". When the transmission is finished unit B inscribes its signature in the same module with the mention "received".

In this way, with each transfer, the transaction registration section is updated with the signature for the units through which the file will have passed. Once the maximum number of authorised transfers is obtained the transaction registration section as well as the header of the product are sent to the operating center for their verification. These verifications arriving from the user units can be signed by the operating center and sent to the on-line data base server MS.

Figure 6:
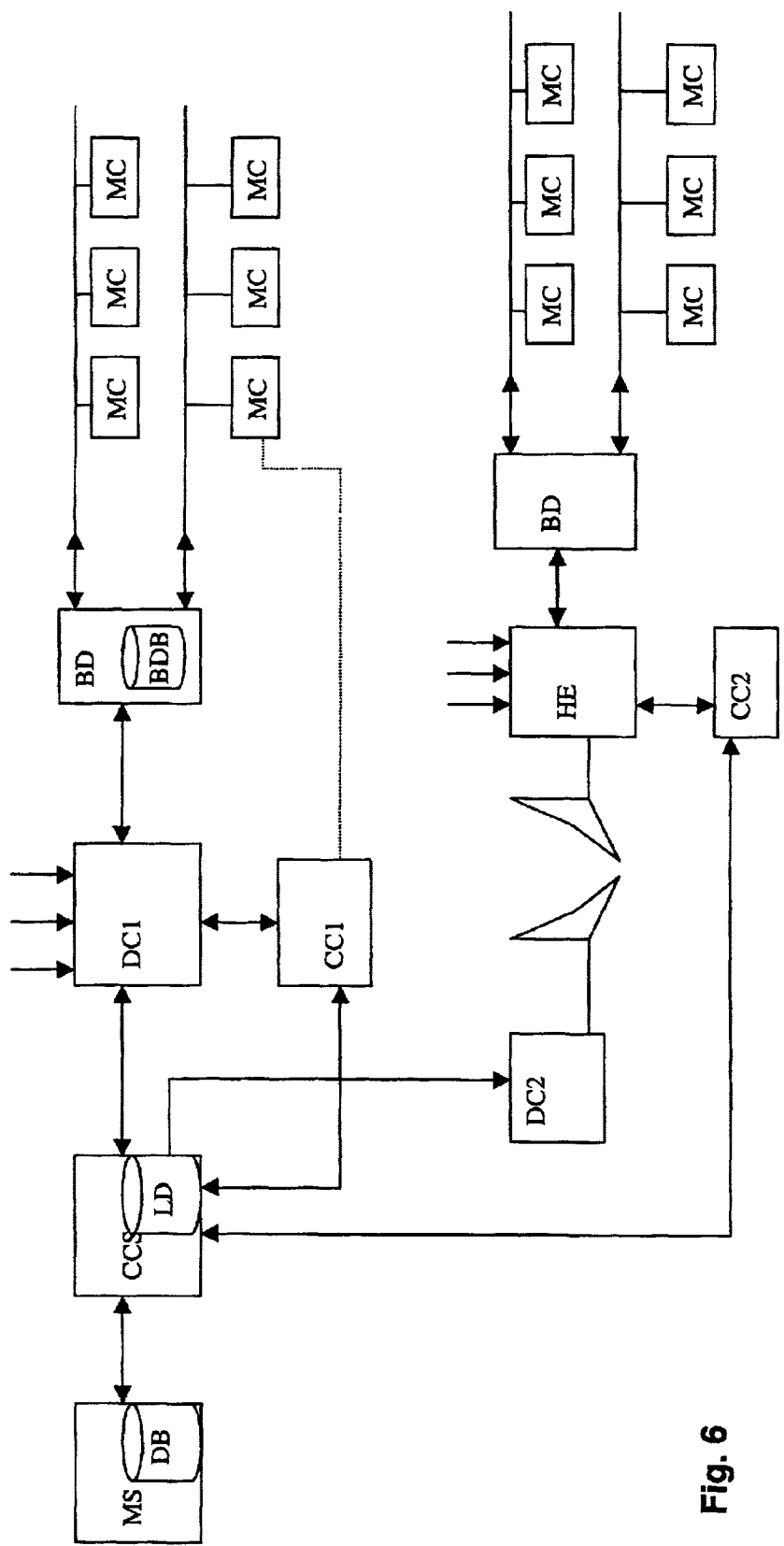
FIG. 6 represents a system architecture, according to the invention, implementing different operators.

According to an architecture that implements different operators such as illustrated in FIG. 6, the on-line data base server MS with its data base DB is linked to a processing center CCS. In our example, this center is linked to two distribution centers DC1 and DC2. The first is linked to user groups MC by a high speed bidirectional link. Generally a user group is linked to a head end BD whose functionality can be more or less advanced. The most simple version only works as relays between the distribution center and the user group below, the most sophisticated varieties allow to make transfers between two user groups and have their own storage means BDB.

The user units MC can call the call collection center CC1 for the operations of requesting products. According to the chosen authorisation modes the distribution center DS1 does not have the means to authorise the decryption of a product, it requests this to the processing center CCS. It is to be noted that the distribution center DS1 can propose a service palette coming from several sources and is administered by a different entity from the one administering the processing center. This is the reason why the latter cannot delegate the authorisation and demand to receive the requests for products. This demand can equally be applied to the on-line data base service MS. According to an embodiment the product X is encrypted by a first key generated by the on-line data base service MS and by a second key coming from the processing center CCS.

According to an embodiment of this configuration several processing centers CCS and on-line data base services MS, share the supply of these products. The distribution center DS receives the requests of the users and relays this demand depending on the place where these products are. The product header HD includes an indication of the source of this product (the on-line data base service) as well as the processing center in charge of the latter.

The distribution center DS2 is connected to the users by a satellite link. This link arrives at a local server HE that regroups several services. This server then distributes these services for example by means of a cable network.

For the return route to the processing center this server is connected to a call concentrator CC2.

I claim:

1. A system comprising at least one operating centre that has a great number of products and a plurality of user units including security and storage means, wherein all or a part of the user units are connected to at least one local network, the link between a first user unit and a second user unit is of the bi-directional type said user units comprise means for transferring a product encrypted with a transport key and stored in the storage means of the first user unit for sending to the second user unit, the operating centre comprises means for transmitting the authorization to the second unit to decrypt the product.

2. A system according to claim 1, wherein the first user unit comprises means for transmitting the encrypted product to the second user unit, said unit comprising decryption means, in its security means, of the transport key sent by the operating centre and encrypted with a key specific to the second user unit.

3. A system according to claim 1 or 2, wherein at least said second user unit comprises means for requiring and reading the list of products that are stored in the storage units of the other user units connected to the same local network and for sending this list to the operating centre.

4. A method for optimizing the transmission upon request of products between an operating and distribution centre and a plurality of user units comprising the following steps:

sending a request for transmission of a product to the operating centre from second user unit connected to a local bi-directional network, determining if the requested product is already in any first user unit connected to the same local network, in the negative event, transmitting from the operating centre to the second user unit and storing the product in encrypted form in said second user unit, in the positive event, ordering the transfer of the product from the first unit to the user unit, transmitting by the operating centre the necessary data for the decryption of the product.

5. A method according to claim 4, the product is encrypted by a transport key, which key being encrypted with a key specific to the second user unit and sent to the latter by the operating centre.

6. A method according to claim 4, consisting in ordering the storage of the product one user unit among the user units connected to the same local network.

7. A method according to claim 4 wherein the selection of the user unit, chosen among the user units connected to the same local network for receiving the product and not having requested the product, is carried out according to a consumption profile of said unit.

8. A method according to claim 7, wherein the consumption profile is established according to the type of product normally consumed.

9. A method according to claim 7, wherein the consumption profile is established according to the activity ratio of said user unit.

10. A method according to claim 4 consisting in, prior sending a request to the operating centre, determining the products that are stored in the units connected to the same network and transmitting these data to the operating centre.

11. A method according to claim 4 consisting in sending a product, prior to a user request, to at least one user unit among the user units connected to the same local network.

12. A method according to claim 4, consisting in:

encrypting the product with a second key by a data server connected to the operating center or processing center, transmitting the request for the product to the data server, which after verification, returns the second key encrypted with a transport key defined by the operating or processing centre.

13. A method according to claim 12, wherein the product comprises a header and a transaction registration zone, and consisting in marking this zone with the signature of the emitting unit and with the signature of the receiving unit.

14. A method according to claim 13, wherein the operating centre can at any tune request the re-emission of the transaction zone accompanied by the product header to a user unit for verification.

* * * * *